United States Patent Office 3,826,695
Patented July 30, 1974

3,826,695
FOAMED MOLTEN WELDING POWDERS WITH LOW BULK DENSITY
Wolfgang Leicher and Anton More, Burghausen, Germany, assignors to Wacker-Chemie GmbH, Munich, Germany
No Drawing. Filed Feb. 1, 1973, Ser. No. 328,821
Claims priority, application Germany, Feb. 9, 1972, P 22 06 156.9
Int. Cl. B23k 35/34
U.S. Cl. 148—26                                3 Claims

ABSTRACT OF THE DISCLOSURE

A foamed molten welding powder with low bulk density to be used for submerged arc welding, advantageously for pore-free plating, said powder having the following chemical analysis:

|  | Percent by weight |
|---|---|
| $SiO_2$ | 37–46.5 |
| $Al_2O_3$ | 4–18 |
| CaO | 5–13 |
| MgO | 18–35 |
| $Na_2O + K_2O$ | 3–6.5 |
| Combined fluorine | 3–6.5 |

The present invention relates to foamed molten welding powders. Powders of this type are primarily used for rapid welding, for the welding of fillet welds, and for plating.

Plating with Niro-bands (stainless steel bands), which is for instance used in the production of pressure tanks, has only been practiced for a few years. Before that, there were no powders available for making such platings in satisfactory quality. Due to the high specifications existing for the surface of plated articles and due to the particular significance of the powder in the formation of the surface, the quality of the powder has to meet very high standards. Among the most important requirements which a plating powder has to meet, is the formation of a slightly curved, delicately marked cover layer, the absence of pores in the surface, as well as easy removal of the slag from the plating.

The requirement of a surface definitely free of micropores has not been realized with any plating powder up to now. However, since it is necessary to remove the micropores at the surface of the plating by grinding at high expense, there is a strong need for welding powders yielding plated surfaces free of pores.

According to the present invention, a foamed molten welding powder with low bulk density has now been found for submerged arc welding, preferably to be used for plating by welding, the powder having the important advantage of yielding a cladding free of pores. The following composition of the powder has been established by analysis:

|  | Percent by weight |
|---|---|
| $SiO_2$ | 37–46.5 |
| $Al_2O_3$ | 4–18 |
| CaO | 5–13 |
| MgO | 18–35 |
| $Na_2O + K_2O$ | 3–6.5 |
| Combined fluorine | 3–6.5 |

It came as a complete surprise that the reduction of the amount of fluorine of the welding powder increases the absence of pores. This fact is so unexpected since it was common belief among the persons skilled in this art that the absence of pores in a welding powder for submerged arc welding powder increases with the amount of fluorine. Furthermore, it was found that an increase in the amount of $Al_2O_3$ is favorable for the absence of pores in the weld.

However, when the contents in $Al_2O_3$ exceeds the upper limit, the surface of the plating becomes uneven and the removal of slag becomes more difficult to a marked degree. It is true that with $Al_2O_3$ contents above the figures mentioned as satisfactory, welds free of pores will be obtained with the powders if the optimum fluorine content is slightly exceeded. But in view of the shortcomings described when powders of too high a content in $Al_2O_3$ are used, these powders are of inferior quality.

In the following, an example is given of an especially satisfactory welding powder for submerged arc welding, particularly for plating by welding:

|  | Percent by weight |
|---|---|
| $SiO_2$ | 40–46 |
| $Al_2O_3$ | 6–11 |
| CaO | 7–13 |
| MgO | 22–32 |
| $Na_2O + K_2O$ | 3.5–6.5 |
| Combined fluorine | 4–6.5 |

To what extent the composition affects the properties of the plating powder can be seen from the table below, in combination with the following discussion.

|  | $SiO_2$ | $Al_2O_3$ | CaO | MgO | $Na_2O + K_2O$ | F | Surface appearance | Absence of pores | Solubility of slags |
|---|---|---|---|---|---|---|---|---|---|
| 1 | 43.7 | 9.5 | 8.45 | 29.68 | 5.05 | 4.59 | Very good | Good | Very good. |
| 2 | 46.0 | 9.58 | 9.46 | 26.10 | 4.80 | 5.81 | do | do | Good. |
| 3 | 37.93 | 16.73 | 12.77 | 20.24 | 6.40 | 6.42 | Good | do | Do. |
| 4 | 41.17 | 10.68 | 12.49 | 23.95 | 6.63 | 7.20 | do | Bad | Do. |
| 5 | 43.57 | 5.22 | 13.38 | 26.37 | 6.83 | 7.15 | do | Bad | Do. |
| 6 | 35.42 | 22.29 | 12.43 | 18.14 | 6.41 | 6.70 | Bad | Good | Bad. |

Powers Nos. 1–3 whose composition is within the given limits, yield upon plating good surface appearance, good absence of pores, and very good solubility of slags.

Powders Nos. 4 and 5 (high F-content) show good surface appearance and the slag dissolves well, but the absence of pores is poor.

Powder No. 6 ($Al_2O_3$-content too high) is free of pores, but upon welding, the surface exhibits marked wave formation and the slag removal is difficult.

It has also been found that up to 6% MgO can be replaced by $ZrO_2$, which advantageously affects the surface of the plating. However, the addition of $ZrO_2$, e.g. as Zr-silicate, is only advantageous for such powders which are used for welding unstabilized bands, since using stabilized bands, zirconium will cause adherence of the slag by glazing.

It should be understood that the powders according to the invention can also be used for submerged arc welding with wire, particularly in welding of fillets, as well as for plating with so-called "black bands" (e.g. for hard surfacing) and with nickel-base alloys.

While only a few examples are described, it will be obvious to those persons skilled in the art that many changes and modifications may be made thereunto without departing from the spirit and scope of the invention.

What is claimed is:

1. A foamed molten welding powder with low bulk density for submerged arc welding, said powder having the following chemical analysis:

| | Percent by weight |
|---|---|
| $SiO_2$ | 37–46.5 |
| $Al_2O_3$ | 4–18 |
| CaO | 5–13 |
| MgO | 18–35 |
| $Na_2O+K_2O$ | 3–6.5 |
| Combined fluorine | 3–6.5 |

2. The weld powder according to claim 1, having the following chemical analysis:

| | Percent by weight |
|---|---|
| $SiO_2$ | 40–46 |
| $Al_2O_3$ | 6–11 |
| CaO | 7–13 |
| MgO | 22–32 |
| $Na_2O+K_2O$ | 3.5–6.5 |
| Combined fluorine | 4–6.5 |

3. The welding powder according to claim 1, wherein up to 6% by weight of MgO are replaced by $ZrO_2$.

References Cited

UNITED STATES PATENTS 3,211,591  10/1965  Miltschitzky et al. ____ 148—26
3,551,218  12/1970  Gurevich _____ 148—26

ANTHONY SKAPARS, Primary Examiner